United States Patent Office 3,138,575
Patented June 23, 1964

3,138,575
PROCESS FOR THE ANIONIC POLYMERIZATION OF OMEGA - LACTAMS WITH POLY(FLUORO-METHYLENE) SULFIDE AS ACTIVATOR
Donald Stanley Acker, Wilmington, Del., assignor to E. I. du Pont de Nemours and Company, Wilmington, Del., a corporation of Delaware
No Drawing. Filed Sept. 15, 1961, Ser. No. 138,301
24 Claims. (Cl. 260—78)

This invention relates to an improved process for the anionic polymerization of lactams. More particularly, it relates to a process for the rapid anionic polymerization of omega-lactams wherein new co-catalysts are used to achieve high polymerization rates and fast polymer set-up times at temperatures well below the polyamide melting point.

Polymerization of an important member of the class of ω-lactams, ε-caprolactam (hereinafter called simply caprolactam), to the polycarboxylamide, 6-nylon, has been known for several decades. Early caprolactam polymerizations were catalyzed by acidic catalysts and small amounts of water and required long polymerization times, i.e., of the order of hours or even days. Later, the polymerization of caprolactam was found to occur relatively more rapidly when basic materials, particularly the alkali and alkaline-earth metals or their compounds, were present and the polymerization system was substantially anhydrous. These base-promoted or anionic polymerizations required temperatures above 200° C. Since these applied temperatures approach or even exceed the polyamide melting point and since the polymerization reaction is moderately exothermic, liquid (molten) polycarboxylamide is present during at least part of the anionic polymerization.

Exceeding the melting point of the polycarboxylamide during the polymerization has several disadvantages, particularly when the lactam is to be polymerized in situ as a shaped article, coating, or the like. For example, in utilizing the high-temperature anionic polymerization procedures in casting or molding operations, the molds must be cooled appreciably before the molten or semimolten article solidifies and can safely be removed. Thus molding and casting cycles of economically unattractive lengths are required. In addition, the high peak temperatures and the wide temperature ranges through which the shaped articles or coatings are cycled often lead to shrinkage voids and other faults in the finished, cooled polymer.

Primarily because of these and other disadvantages inherent in the anionic polymerization of ω-lactams, a variety of co-catalysts have been evaluated in the polymerization in recent years. However, not all the co-catalysts tried heretofore have been entirely satisfactory with respect to such factors as basic cost and effectiveness in low concentrations; required polymerization temperatures and times; conversions of lactam to polycarboxylamide; and polymer molecular weights. Hence, the need for new, improved co-catalysts for the anionic polymerization of ω-lactams has continued.

Thus, an object of this invention is to provide a new, improved process for the rapid polymerization of omega-lactams to high molecular weight polycarboxylamides at temperatures between the fusion points of the monomeric omega-lactams and the melting points of the resulting polycarboxylamides. Another object of this invention is to provide a process for the anionic polymerization of omega-lactams which employs new, improved co-catalysts which promote this polymerization. Other advantages of this invention will appear hereinafter.

In accord with the objects of the present invention, it has been found that the use of a small proportion of a new class of co-catalysts, polymeric fluorinated methylene sulfides, in the anionic polymerization of ω-lactams promotes rapid conversion of the lactams to solid polycarboxylamides at temperatures between the lactam fusion point and the polycarboxylamide melting point. Polymeric fluorinated methylene sulfides effective in the anionic polymerization include linear polymers which are characterized by the recurring structural unit ᵗS—(CFX)ᵗ, where the X substituent is either chlorine or fluorine. Representative and particularly preferred members of this class are polymeric fluoromethylene sulfides having number average molecular weights of at least about 2000. Copolymers having recurring structural units ᵗS—CF$_2$ᵗ and ᵗS—CFClᵗ are likewise effective as co-catalysts in the process of this invention. Another group of polymeric fluorinated methylene sulfides effective as co-catalysts are the cyclic dimers (polyfluoro-1,3-diethietanes). These polymeric sulfides, which will be described more fully hereinafter, are effective co-catalysts in concentrations as low as 0.05 mole percent of the lactam to be polymerized.

In carrying out the process of the invention with, for example, caprolactam, the caprolactam, in a substantially anhydrous state, i.e., containing less than 0.1% water, is first heated to a temperature above its melting point (68–69° C.) but below about 225° C. with a small amount of base to prepare the anionic catalyst therein. All or a portion of the caprolactam to be polymerized may be present in this reaction. Suitable bases are those which are sufficiently strong to form an iminium salt of the lactam which, in the case of caprolactam, may be represented simply as:

where M⁺ is a cation, particularly a metallic cation. Bases suitable for the preparation of the anionic catalysts include the alkali metals, e.g., sodium, potassium, and lithium, the alkaline earth metals, e.g., magnesium, calcium, strontium, and barium, and the strongly basic compounds of these metals, such as the hydrides, oxides, hydroxides, alkoxides, amides, borohydrides, alkyls, and aryls. The amount of base may vary from about 0.1 to 10 mole percent of the total ω-lactam, although a base concentration of about 0.2 to 5 mole percent of the lactam is generally preferable in order to achieve higher molecular weight polycarboxylamides.

The time required to prepare the anionic catalyst will vary from a few minutes to several hours, depending upon such factors as the type (strength) of the base used, the base concentration, and the reaction temperature. In general, reaction times within the range of 10 to 120 minutes, are suitable.

To remove any low-molecular-weight material evolved during the preparation of the anionic catalysts and also to prevent oxidation, it is desirable to bubble nitrogen or another chemically-inert gas through the lactam melt during the preparation of the anionic catalyst. Alternatively, the reaction of the lactam with the base may be conducted under reduced pressure and low molecular weight material removed, together with some of the lactam, by distillation.

Following the preparation of the anionic catalyst, the polymeric fluoromethylene sulfide co-catalyst, optionally mixed with additional catalyst-free ω-lactam, is added to the lactam containing the anionic catalyst, and the resulting mixture is heated to, and maintained at, a temperature between the fusion point of the lactam monomer and the melting point of the polycarboxylamide product until a solid polycarboxylamide is obtained. Thus, e.g., in polymerizing caprolactam to solid polycaprolactam, temperatures of from 100° to 200° C., preferably 140° to 180° C., are suitable. Polymerization to solid polymer is rapid at these temperatures when the fluoromethylene sulfide polymer co-catalyst is used in proportions of 0.05 to about 2.5 mole percent of the total ω-lactam, preferably in proportions of 0.1 to 0.5 mole percent.

The preferred fluoromethylene sulfide polymer co-catalysts of the present invention are linear fluoromethylene sulfide polymers having a number average molecular weight of at least about 2000 and composed of at least one of the recurring structural units $\mathrm{+S-CF_2+}$ and $\mathrm{+S-CFCl+}$. However, by the term "fluoromethylene sulfide polymers," it is intended to include low polymers, such as the cyclic dimers, the trimers, oligomers, etc., as well as polymers having relatively higher molecular polymers, are the preferred co-catalysts in the process of this invention. Lower molecular weight oligomers, which can be obtained by degradation of the high polymers under fluorinating conditions, also are effective co-catalysts, although not as active as the higher polymers.

Various modes of effecting the process of the present invention and their advantages are illustrated in the following examples. The invention is not to be construed as being limited to the exact materials and procedures shown therein, since obvious modifications will occur to those skilled in the polymer art.

For simplification, the fluoromethylene sulfide polymers used as co-catalysts in the runs of the examples have been asigned code letters of A through D, inclusive. A brief description of each of these co-catalysts is provided in Table I.

TABLE I

*Halogenated Methylene Sulfide Polymer Co-Catalysts*

| Code | Polymer Type | Molecular Weight (Number Average) | Synthesis |
|---|---|---|---|
| A | 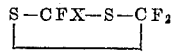 | Above 500,000 | S=CF₂ polymerized at -80° C. in dry ether with dimethylformamide as an anionic polymerization initiator. |
| B | CF₃—(CF₂S)z—CF₃ (z=average 10) | Average 935 | High molecular weight $\mathrm{+S-CF_2+}$ polymer of the type described under Code A was dissolved in CCl₄ and fluorinated with SbF₅ at room temperature. The oily product obtained was again fluorinated in unsymmetrical trichlorotrifluoroethane with SbF₅. Distillation of this product yielded the oligomer. |
| C | 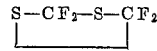 | 50,000–100,000 | S=CFCl polymerized at -80° C. in heptane with a mixture of (C₂H₅)₃B and (C₂H₅)₂BO₂C₂H₅ as polymerization initiator. |
| D | 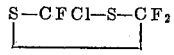 (3/1 copolymer)—$\mathrm{+S-CF_2+}$ and $\mathrm{+S-CFCl+}$ in random sequence. | 50,000—100,000 | Mixture of S=CF₂ and S=CFCl in bulk polymerized at -80° C. by treating first with (C₂H₅)₃B and then with (C₂H₅)₂BO₂C₂H₅ |

*p indicates a degree of polymerization sufficient to give the indicated $M_n$.

weights, i.e., of the order of about 2000 to 500,000 or more.

Preparation of the fluoromethylene sulfide polymers is described in U.S. Patent 2,980,695, issued April 18, 1961, to W. J. Middleton, and in U.S. application Serial Number 106,533, filed May 1, 1961, by W. J. Middleton. As is stated in the patent, cyclic dimers of the formula $$\mathrm{S-CFX-S-CF_2}$$

wherein X is a fluorine or chlorine, and known as polyfluoro-1,3-dithietanes, are obtainable from thiophosgene dimer (tetrachloro-1,3-dithietane) by reaction with antimony fluorides. The products of this reaction, tetrafluoro-1,3-dithietane $$\mathrm{S-CF_2-S-CF_2}$$

and chlorotrifluoro-1,3-dithietane, $$\mathrm{S-CFCl-S-CF_2}$$

are suitable as co-catalysts in the present process. Pyrolysis of these cyclic polyfluoro-1,3-dithietanes (tetrafluoro-1,3-dithietane and monochlorotrifluoro-1,3-dithietane) at very high temperatures (400°–900° C.) provides thiocarbonyl fluoride and thiocarbonyl chlorofluoride monomers which are suitable, either as pure monomers or as a mixture of comonomers, for polymerization, either spontaneously on standing, or by either free-radical catalysis or by anionic catalysis to polyfluoromethylene sulfides, having the structures $\mathrm{+S-CFX+_p}$, in which X is fluorine or chlorine and p represents a degree of polymerization sufficient to give a number average molecular weight in the range of about 2,000 to 500,000. These polyfluoromethylene sulfides, both homopolymers and co-

EXAMPLE 1

To prepare caprolactam containing an anionic catalyst, a mixture of 16 grams of caprolactam containing less than 0.05% water and 0.065 gram (0.85 mole percent) of sodium methoxide was charged to a glass test tube, and the test tube was placed in a constant-temperature bath at 150° C. Nitrogen was bubbled through the molten mass at a rate of 350 cc. per minute. After 20 minutes at 150° C., during which no polymerization occurred, 0.023 gram (0.2 mole percent) of the poly(difluoromethylene sulfide), Table I code designation A, was added to the anionic catalyst-containing melt as a co-catalyst. Following this addition, the bubbling of nitrogen through the melt was continued for about 30 seconds, and then the nitrogen inlet tube was raised to allow the gas to pass over the melt. The tube containing the homogeneous, bubble-free melt was maintained in the constant-temperature bath at 150° C., and the polymerizing mass was observed continuously after the addition of the co-catalyst. In 3.75 minutes, the mass became sufficiently viscous that the meniscus remained undisturbed when the test tube was turned through an angle of approximately 45°, and set-up or solidification of the polymerizing mass to a point where no further change could be observed in the surface of the mass occurred 7.5 minutes after the co-catalyst addition. Nine (9) minutes after the addition of the co-catalyst, the tube was taken from the bath, cooled to room temperature, and the polymer removed for evaluation. In a relative viscosity determination in which an attempt was made to prepare a 0.42 weight percent solution of the polymer in 90% formic acid at 25.0° C., the polymer was found to be insoluble. The amount of low molecular weight material in the polymer was determined by grinding some of the polymer to 20-mesh size and extracting 5 grams of these granules with 60 ml. of boiling water for 24 hours. The extractable material by this method constituted 4.2 weight percent of the total polymer product.

Anionic polymerization of caprolactam does not occur under the foregoing conditions without the co-catalyst component. A comparative experiment was conducted in which the above-described procedure was followed except for the omission of the fluoromethylene sulfide polymer co-catalyst. Essentially no polymerization occurred after the reaction mixture had been in the constant-temperature bath at 150° C. for 8 hours.

In preparing the anionic catalyst, other strong bases such as sodium hydroxide or potassium hydroxide, sodium hydride, sodium phenyl, or butyl lithium, may be used in place of the aforementioned sodium methoxide. For example, the anionic catalyst has been prepared by adding 1 mole percent of sodium hydroxide or potassium hydroxide to substantially anhydrous caprolactam and bubbling nitrogen through the resulting mixture at a rate of 5000 cc. per minute per pound of lactam while heating for 1 hour at 100° C. in the case of the sodium hydroxide and at 86° C. in the case of the potassium hydroxide.

EXAMPLES 2-5

The procedure in the runs of these examples (Table II) was the same as that of Example 1, except that the concentrations of sodium methoxide and the types and amounts of fluoromethylene sulfide polymer co-catalysts were those specified in the table.

In Table II, "no-flow" time refers to the period following addition of the fluoromethylene sulfide polymer co-catalyst required for the polymerizing mass to become sufficiently viscous that the meniscus remained undisturbed when the test tube was tilted through an angle of approximately 45°. Set-up time refers to the period of time after which no change could be observed in the appearance of the surface of the polymer mass, and total time signifies the entire period during which the polymerizing mass was in the constant-temperature bath following the addition of the co-catalyst. $\eta_r$ refers to relative viscosity and percent E to percent water extractables, both determined as outlined in Example 1.

TABLE II

Anionic Polymerization of Caprolactam—Direct Addition of Halogenated Methylene Sulfide Polymer Co-Catalyst to Caprolactam Containing Anionic Catalyst (150° C. Bath Temp.)

| Example No. | NaOCH₃ Concn. (mole percent) | Co-catalyst | | "No-Flow" Time (min.) | Set-up Time (min.) | Total Time (min.) | $\eta_r$ | Percent E |
|---|---|---|---|---|---|---|---|---|
| | | Code Designation | Concn. (mole percent) | | | | | |
| 2 | 1.5 | A | 0.2 | 1.75 | 5.5 | 6.25 | Gel* | 7.1 |
| 3 | 1.5 | B | 0.2 | 4.5 | 10 | 12 | Gel | 5.1 |
| 4 | 1.5 | C | 0.2 | 9 | 14 | 15 | Gel | 7.2 |
| 5 | 1.5 | D | 0.2 | 9.5 | 14 | 17 | Gel | 6.3 |

*I.e., 0.42 weight percent of the polymer did not dissolve in 90% formic acid at 25° C.

EXAMPLES 6–12

In Examples 6 to 12 (Table III), the general procedure of Example 1 was followed except that only one-half the caprolactam to be polymerized (8 grams) was present during the reaction with the sodium methoxide to prepare the anionic catalyst. Into the anionic catalyst-containing lactam melt then was introduced an additional 8 grams of caprolactam, which previously had been mixed with the indicated type and amount of fluoromethylene sulfide polymer co-catalyst by pretreating for about 20 minutes at 150 or 175° C. If pretreated at 175° C., the mixture was heated an additional 20 minutes at 150° C. to achieve thermal equilibration before addition to the lactam-anionic catalyst melt. The results are recorded in Table III, where the headings have essentially the same meanings as those of Table II. In Table III, "preheat temperature" refers to the temperature at which the second half of the lactam and the co-catalyst were treated prior to addition to the lactam containing the anionic catalyst. The recorded concentrations of the sodium methoxide (1.5 mole percent in all cases) and of the fluoromethylene sulfide polymers are based on the total caprolactam, and the time of addition of the lactam-co-catalyst mixture is considered "zero time" in recording the "no-flow," set-up, and total times for each run.

TABLE III

Anionic Polymerization of Caprolactam—Addition of Premixed Caprolactam-Fluoromethylene Sulfide Co-Catalyst Stream to Caprolactam Containing Anionic Catalyst (1.5 Mole Percent NaOCH₃; 150° C. Bath Temperature)

| Example No. | Co-catalyst | | Preheat Temp. (° C.) | "No-Flow" Time (min.) | Set-up Time (min.) | Total Time (min.) | $\eta_r$ | Percent E |
|---|---|---|---|---|---|---|---|---|
| | Code Designation | Conc. (mole percent) | | | | | | |
| 6 | A | 0.2 | 150 | 1.5 | 3.5 | 4.5 | Gel* | 4.3 |
| 7 | A | 0.2 | 175 | 1.25 | 4 | 6 | Gel | 4.0 |
| 8 | A | 0.1 | 175 | 2 | 5 | 7.25 | Gel | 6.4 |
| 9 | A | 0.05 | 175 | 3 | 8.5 | 10.5 | Gel | 9.3 |
| 10 | B | 0.2 | 175 | 5 | 9.5 | 11.5 | Gel | 4.6 |
| 11 | C | 0.2 | 175 | 3 | 6 | 7.5 | Gel | 5.4 |
| 12 | D | 0.2 | 175 | 3.5 | 8.5 | 10.25 | Gel | 6.6 |

*I.e., 0.42 weight percent of polymer did not dissolve in 90% formic acid at 25° C.

The procedure generally described in Examples 6 to 12, wherein the fluoromethylene sulfide polymers are briefly heated with a portion of the caprolactam monomer prior to addition to the lactam containing the anionic catalyst, is sometimes of advantage in improving the homogeneity of the polycarboxylamide product. This is judged by the absence of visible discolored particles therein. Preheating, e.g., at 140 to 180° C., for, say, 2 to 30 minutes, has been found to be suitable. The preheating, however, has no appreciable effect on the time required for polymerization or on other characteristics of the polyamide products. For example, Example 7 (Table III) was repeated four times, the only change in procedure being the period of time during which the mixture of half the caprolactam to be polymerized (8 grams) was preheated at 175° C. with the co-catalyst. These preheat periods were 2, 5, 10, and 15 minutes, respectively. Compared with the run of Example 7, in which a 20-minute preheat at 175° C. was used, there were no significant differences in "no-flow" and polymer set-up times, both as hereinbefore defined, in any of the four comparative runs, and the four comparative polyamide products were all classed as "gels," also as previously defined, and hence were of very high molecular weight. An increase in polymer homogeneity, i.e., a decrease in the content of visible discolored particles, was, however, characteristic with increase in preheat time through the range of 2 to 20 minutes, after which time no discolored particles were apparent in the final polymer.

Results qualitatively similar to those in the foregoing examples were achieved when fluoromethylene sulfide polymers having the structure $\{S-CFX\}_q$, where $q$ indicates a lower degree of polymerization, such as trimers, tetramers, and oligomers, were employed as co-catalysts. These lower polymers, however, do not show as great activity as the high molecular weight polymers. The cyclic dimers (polyfluoro-1,3-dithietanes) likewise are effective as co-catalysts in the process of this invention, as illustrated by the following example:

EXAMPLE 13

A mixture of 16 g. of caprolactam, containing less than 0.05% water, and 0.125 g. (1.5 mole percent) of sodium methoxide was charged to a glass reaction vessel which was placed in a constant-temperature bath at 150° C. Nitrogen was bubbled through the molten mixture at a rate of about 350 cc. per minute. After 20 minutes at 150° C., during which no polymerization occurred, .047 g., 0.2 mole percent, of tetrafluoro-1,3-dithietane was added to the caprolactam containing the anionic catalyst. Following this addition of the co-catalyst, the bubbling of nitrogen through the melt was continued for about 30 seconds, and then the nitrogen inlet tube was raised to allow the gas to pass over the melt. The vessel containing the homogeneous, bubble-free melt was maintained in the bath at 150° C., and the polymerizing mass was observed continuously after this addition of co-catalyst. The no-flow time was 10.5 minutes, the set-up time was 18 minutes, and the total time at 150° C. for complete polymerization was 21.5 minutes. The product had a solution viscosity ($\eta_r$) of 5.8 and contained 16.3% extractables. This sample of 6-nylon could be compression molded to a strong film by conventional techniques.

The process of this invention is suitable for the polymerization of other omega-lactams, as previously described and as illustrated by the following examples:

EXAMPLE 14

The process of Example 1 was followed except that 20 g. of caprylolactam was substituted for the caprolactam employed in Example 1. The reaction rate achieved was very rapid, and the high molecular weight polycarboxylamide product (8-nylon) contained essentially no extractables, making it particularly suitable for uses where the presence of monomer is undesirable, such as in food-handling equipment. Similar results were achieved with laurolactam.

EXAMPLE 15

In this example, the general procedure of Examples 6-12 was followed to polymerize enantholactam, i.e., the anionic catalyst was prepared by heating half (4 g.) of the enantholactam to be polymerized with the strong base— in this case, 1.5 mole percent of NaOH, based on 8 g. total enantholactam—for 20 minutes at 150° C. Meanwhile, a second 4 g. portion of enantholactam was heated at 175° C. for 20 minutes with 0.2 mole percent, based on 8 g. total lactam, of a polymeric fluoromethylene sulfide having the structure indicated as A in Table I; this solution of co-catalyst in lactam was held at 150° C. for 20 minutes to insure temperature equilibrium prior to mixing with the lactam containing the anionic catalyst. Mixing was achieved by allowing the nitrogen to bubble through the molten mass for 15 seconds after addition of the co-catalyst solution. This polymerization was very rapid. No-flow time was 45 seconds from time of mixing at 150° C.; set-up time was 1.5 minutes, and total time at 150° C. was 3.75 minutes. The resulting polycarboxylamide (7-nylon) was a very high molecular weight polymer (gel was obtained in an attempt to measure solution viscosity of a 0.42% polymer solution in 90% formic acid at 25° C.). This 7-nylon product could be molded by conventional techniques to give a strong, tough film. It contained only 1.7% extractables.

The quality of the ω-lactam polymers is assessable not only in terms of such properties as molecular weight and content of low molecular weight materials but also in terms of physical properties indicative of commercial usefulness. The polycarboxylamides achieved by the process of this invention can be molded into sheets by conventional techniques and subjected to conventional ASTM tests. They exhibit properties at least equal, and, in some cases, superior to, polycarboxylamides made by melt polymerization techniques well known in the art. The process of this invention gives, for example, solid polycaprolactam which is tough and impact-resistant and hence is suitable as articles of hardware, such as protective housings for electrical and electronic fixtures and components, and in like applications. The particular advantages of the present process are most readily apparent when the lactams are polymerized in situ to form filled or unfilled shaped articles or coatings and polymer-impregnated fibrous webs.

If desired, a solution of an anionic catalyst in omega-lactam and a solution of a polymeric fluoromethylene sulfide co-catalyst in the omega-lactam can be prepared in advance and stored at room temperature or below either separately or as a mechanical mixture of solid particles until it is desired to prepare the polycarboxylamide. At that time these solid solutions can be remelted, mixed, and polymerized. It also is possible to prepare the separate ω-lactam solutions of anionic catalyst and co-catalyst, cool the solution to just above the fusion point, mix them and immediately quench the mixture to room temperature or below to obtain a solid solution and pulverize this to provide a composition which is readily polymerized on fusion. Immediately upon fusion, the molten polymerizing mass, while still highly fluid, can be transferred to a mold or can be extruded or coated onto a substrate.

The process of the invention and its advantages have been described in detail in the foregoing. However, many variations within the spirit and scope of the invention will be apparent to those skilled in the art. For example, ε-caprolactam, because of its commercial availability, has been used in most examples to illustrate the present process, but it has also been shown that rapid anionic polymerization of lactams of other ω-amino alkanoic acids containing 5 or more carbon atoms between the carboxyl carbon and the amino substituent also can be achieved in the presence of the fluoromethylene sulfide polymers as co-catalysts. The polymerizations are conducted between the fusion point of the lactam monomer and the melting point of the polycarboxylamide product. Depending on the lactam chosen, such polymerization temperatures will generally be in the range of 25 to 200° C.

I claim:

1. A process for the rapid polymerization of a substantially anhydrous omega-lactam having from 6–12 carbon atoms in the lactam ring to a solid polycarboxylamide which comprises preparing a solution of an anionic catalyst consisting of an iminium salt of an omega-lactam in the omega-lactam, mixing with this solution a polymeric fluoromethylene sulfide co-catalyst selected from the group consisting of tetrafluoro-1,3-dithietane, monochlorotrifluoro-1,3-dithietane, and linear polymeric fluoromethylene sulfides characterized by the recurring structural unit $\pm S—CFX\pm$, where X is selected from chlorine and fluorine, and maintaining the resultant mixture at a temperature between the fusion point of the omega-lactam and the melting point of the polycarboxylamide until the polycarboxylamide solidifies.

2. A process according to claim 1 in which the omega-lactam is caprolactam.

3. A process according to claim 1 in which the omega-lactam is caprylolactam.

4. A process according to claim 1 in which the omega-lactam is enantholactam.

5. A process according to claim 1 in which the omega-lactam is laurolactam.

6. A process for the rapid polymerization of a substantially anhydrous omega-lactam having from 6 to 12 carbon atoms in the lactam ring to a solid polycarboxylamide which comprises preparing a solution of from 0.2 to 5 mole percent of an anionic catalyst consisting of the iminium salt of said omega-lactam in the omega-lactam, adding to this solution from 0.1 to 0.5 mole percent of a linear polymeric fluoromethylene sulfide co-catalyst characterized by the recurring structural unit $\pm S—CFX\pm$, where X is selected from the group consisting of chlorine and fluorine and by a number average molecular weight of at least 2000, and maintaining the resultant mixture at a temperature between the fusion point of the omega-lactam and the melting point of the polycarboxylamide until the polycarboxylamide solidifies.

7. A process according to claim 6 in which the omega-lactam is caprolactam.

8. A process according to claim 6 in which the omega-lactam is caprylolactam.

9. A process according to claim 6 in which the omega-lactam is enantholactam.

10. A process according to claim 6 in which the omega-lactam is laurolactam.

11. A process according to claim 6 in which the linear polymeric fluoromethylene sulfide co-catalyst is poly(difluoromethylene)sulfide characterized by the recurring structural unit $\pm S—CF_2\pm$ and by a number average molecular weight above 500,000.

12. A process according to claim 6 in which the linear polymeric fluoromethylene sulfide co-catalyst is poly(chlorofluoromethylene)sulfide characterized by the recurring structural unit $\pm S—CFCl\pm$ and by having a number average molecular weight above 50,000.

13. A process according to claim 6 in which the linear polymeric fluoromethylene sulfide co-catalyst is a copolymer characterized by a random sequence of the recurring structural units $\pm S—CFCl\pm$ and $\pm S—CF_2\pm$ and by having a number average molecular weight above 50,000.

14. A process according to claim 6 in which the linear polymeric fluoromethylene sulfide co-catalyst added to the omega-lactam containing anionic catalyst is added as a mixture with the omega-lactam free of anionic catalyst.

15. A process for the rapid polymerization of a substantially anhydrous omega-lactam having from 6 to 12 carbon atoms in the lactam ring to a solid polycarboxylamide which comprises preparing a solution of from 0.2 to 5 mole percent of an anionic catalyst consisting of an iminium salt of said omega-lactam in the omega-lactam, adding to this solution from 0.1 to 0.5 mole percent of a linear polymeric fluoromethylene sulfide co-catalyst characterized by the structure $CF_3(CF_2—S)_zCF_3$ in which z indicates an average degree of polymerization of about 10.

16. A process for the rapid polymerization of a substantially anhydrous omega-lactam having from 6 to 12 carbon atoms in the lactam ring to a solid polycarboxylamide which consists essentially of the following steps: (1) preparing a solution of an anionic catalyst in a portion of the omega-lactam by heating the omega-lactam at a temperature above its fusion point but below about 225° C. with from 0.1% to 10 mole percent, based on the total ω-lactam to be polymerized, of a strong base selected from the group consisting of the alkali metals, the alkaline earth metals, and the hydrides, oxides, hydroxides, alkoxides, amides, borohydrides, alkyls, and aryls of said alkali and alkaline earth metals to form a solution of an iminium salt of said omega-lactam; (2) preparing a co-catalyst solution in a second portion of the ω-lactam by adding to the ω-lactam at a temperature in the range of 140° to 190° C. from 0.1 to 0.5 mole percent, based on the total ω-lactam to be polymerized, of a linear polymeric fluoromethylene sulfide co-catalyst characterized by the recurring structural unit $\pm S—CFX\pm$, where X is selected from the group consisting of chlorine and fluorine, and by having a number average molecular weight of at least 2000; (3) mixing the aforesaid molten portion of ω-lactam containing, respectively, the anionic catalyst and the co-catalyst; and (4) maintaining said ω-lactam mixture containing catalyst and co-catalyst at a temperature in the range of 100° to 200° C. until the resulting polycarboxylamide product solidifies.

17. A process according to claim 16 in which the ω-lactam is caprolactam.

18. A process according to claim 16 in which the ω-lactam is enantholactam.

19. A solid composition, readily polymerizable upon fusion, consisting essentially of a substantially anhydrous omega-lactam having from 6 to 12 carbon atoms in the lactam ring, from 0.1 to 10 mole percent of an anionic catalyst consisting of an iminium salt of said omega-lactam, and from 0.05 to 2.5 mole percent of a polymeric fluoromethylene sulfide co-catalyst selected from the group consisting of tetrafluoro-1,3-dithietane, monochlorotrifluoro-1,3-dithietane, and linear polymeric fluoromethylene sulfides characterized by the recurring structural unit $\pm S—CFX\pm$, where X is selected from chlorine and fluorine, said solid composition being stored at a temperature no higher than room temperature where it remains stable.

20. A composition of claim 19 wherein the omega-lactam is caprolactam.

21. A composition of claim 19 wherein the omega-lactam is enantholactam.

22. A composition of claim 19 wherein the omega-lactam is caprylolactam.

23. A composition of claim 19 wherein the polymeric fluoromethylene sulfide co-catalyst is poly(difluoromethylene)sulfide characterized by the recurring structural unit $\pm S—CF_2\pm$ and by a number average molecular weight above 500,000.

24. A composition of clam 23 wherein the omega-lactam is caprolactam.

References Cited in the file of this patent

UNITED STATES PATENTS

| | | |
|---|---|---|
| 2,241,321 | Schlack | May 6, 1941 |
| 2,980,695 | Middleton | Apr. 18, 1961 |